(12) United States Patent
Crapet et al.

(10) Patent No.: US 11,937,689 B2
(45) Date of Patent: Mar. 26, 2024

(54) APPLICATOR FOR COSMETIC PRODUCT, IN PARTICULAR MASCARA, ASSOCIATED APPLICATOR ASSEMBLY AND METHOD FOR MANUFACTURING SUCH AN APPLICATOR

(71) Applicant: Albea Services, Gennevilliers (FR)

(72) Inventors: Yann Crapet, Fremecourt (FR); Charlotte Wastyn, Paris (FR)

(73) Assignee: ALBEA SERVICES, Gennevilliers (FR)

( * ) Notice: Subject to any disclaimer, the term of this patent is extended or adjusted under 35 U.S.C. 154(b) by 528 days.

(21) Appl. No.: 16/773,963

(22) Filed: Jan. 27, 2020

(65) Prior Publication Data
US 2020/0237086 A1    Jul. 30, 2020

(30) Foreign Application Priority Data
Jan. 25, 2019  (FR) ........................ 1900663

(51) Int. Cl.
*A46B 9/02* (2006.01)
*A45D 40/26* (2006.01)
(Continued)

(52) U.S. Cl.
CPC ............ *A46B 9/021* (2013.01); *A45D 40/265* (2013.01); *A46B 3/005* (2013.01);
(Continued)

(58) Field of Classification Search
CPC . A46B 9/021; A46B 3/005; A46B 2200/1053; A46B 5/002; A46B 5/0025;
(Continued)

(56) References Cited

U.S. PATENT DOCUMENTS 726,716 A  *  4/1903  Maher ...................... A46B 7/06
                                                              15/201
1,592,207 A  *  7/1926  Havrilla ................... A46B 7/02
                                                              15/167.1
(Continued)

FOREIGN PATENT DOCUMENTS

DE    202010014792 U1  *  3/2012   ........... A45D 40/262
DE    202017100134 U1  *  5/2018   ........... A45D 40/262
(Continued)

*Primary Examiner* — Jacqueline T Johanas
*Assistant Examiner* — Holly T. To
(74) *Attorney, Agent, or Firm* — Kilpatrick Townsend & Stockton LLP (57) ABSTRACT

The invention relates to an applicator for a cosmetic product including a first part and a second part that extend along a longitudinal direction of extension from a proximal end towards a free distal end of the applicator, the first part and the second part being configured to form parts for applying the cosmetic product, one of the parts is mounted mobile in for translational with respect to the other of the parts, from at least a first retracted position, to a second deployed position, the first and second parts are configured to form together a variable volume reservoir, intended to contain the cosmetic product and that has a first volume when the parts occupy the first retracted position and a second volume when the parts occupy the second deployed position.

10 Claims, 10 Drawing Sheets

(51) Int. Cl.
*A46B 3/00* (2006.01)
*B33Y 80/00* (2015.01)
*B29L 31/00* (2006.01)

(52) U.S. Cl.
CPC . *A46B 2200/1053* (2013.01); *B29L 2031/718* (2013.01); *B33Y 80/00* (2014.12)

(58) Field of Classification Search
CPC ... A46B 11/0041; A46B 5/005; A46B 5/0054; A46B 11/00; A46B 7/023; A46B 7/02; A46B 5/033; A46B 5/0029; A46B 5/0033; A46B 9/10; A46B 5/0041; A46B 5/0058; A46B 5/0062; A46B 5/0075; A46B 5/0083; A45D 40/265; A45D 40/18; A45D 34/042; A45D 34/043; A45D 34/045; A45D 40/262; A45D 40/264; A45D 34/048; A45D 40/28; A61M 35/00
USPC .............. 132/218, 317, 313; 401/127, 129; 15/172, 167.1, 160, 144, 1–144.4
See application file for complete search history.

(56) References Cited

U.S. PATENT DOCUMENTS

| | | | | |
|---|---|---|---|---|
| 2,111,880 A * | 3/1938 | Waters | A46B 7/02 | 15/176.6 |
| 2,435,394 A * | 2/1948 | Hawley | A46B 7/02 | 15/201 |
| 2,816,305 A * | 12/1957 | Kravitt | A46B 15/00 | 15/106 |
| 3,750,214 A * | 8/1973 | Caliendo | A46B 7/02 | 15/26 |
| 3,879,791 A * | 4/1975 | Isler | A46B 7/06 | 15/201 |
| 4,020,521 A * | 5/1977 | Velasquez | A46B 7/02 | 15/176.4 |
| 4,446,880 A * | 5/1984 | Gueret | A45D 40/265 | 132/218 |
| 4,475,563 A * | 10/1984 | Martin | A46B 15/0051 | 132/223 |
| 6,067,997 A | 5/2000 | Gueret | | |
| 6,367,111 B1 * | 4/2002 | Chen | A46B 7/02 | 15/160 |
| 6,616,366 B1 * | 9/2003 | Weihrauch | A46B 9/021 | 132/218 |
| 8,056,568 B2 * | 11/2011 | Ruckart | A45D 24/04 | 132/901 |
| D664,361 S * | 7/2012 | Edmondson | A46B 9/021 | D4/128 |
| D682,556 S * | 5/2013 | Uresti | A46B 9/021 | D4/128 |
| 8,726,913 B2 * | 5/2014 | Weigel | A46B 7/06 | 132/218 |
| 8,783,989 B2 * | 7/2014 | Weigel | A46B 5/0075 | 132/218 |
| 8,944,713 B2 * | 2/2015 | Koguchi | A45D 40/205 | 401/32 |
| 9,113,758 B1 * | 8/2015 | O'Brien | A47K 11/10 | |
| 10,888,152 B2 * | 1/2021 | De Bardonneche | A46B 9/021 | |
| 2004/0187241 A1 * | 9/2004 | Katz | A47K 11/10 | 15/210.1 |
| 2008/0083421 A1 * | 4/2008 | Malvar | A45D 40/267 | 15/207.2 |
| 2008/0127989 A1 * | 6/2008 | Chapman | A45D 24/10 | 132/118 |
| 2009/0065020 A1 * | 3/2009 | Butcher | A46B 9/021 | 15/160 |
| 2009/0071499 A1 * | 3/2009 | Wyatt | A46B 9/028 | 401/268 |
| 2009/0276973 A1 * | 11/2009 | Bouix | A46B 9/021 | 15/207.2 |
| 2010/0212682 A1 * | 8/2010 | Pires | A46B 15/0002 | 132/218 |
| 2011/0262208 A1 | 10/2011 | Albea | | |
| 2011/0297173 A1 * | 12/2011 | Anderson | A46B 5/0054 | 132/218 |
| 2011/0297174 A1 * | 12/2011 | Ornoski | A45D 34/042 | 401/122 |
| 2011/0299913 A1 * | 12/2011 | Simard | A46B 5/0054 | 401/268 |
| 2014/0283868 A1 * | 9/2014 | Zech | A46B 11/0006 | 132/218 |
| 2014/0360521 A1 * | 12/2014 | Caulier | A46B 9/026 | 132/218 |
| 2018/0000228 A1 | 1/2018 | Albea | | |
| 2018/0020816 A1 * | 1/2018 | Earl | A46B 9/021 | 15/172 |
| 2018/0055205 A1 * | 3/2018 | Pires | A45D 40/267 | |
| 2018/0177281 A1 * | 6/2018 | Pires | A45D 40/264 | |
| 2018/0220785 A1 * | 8/2018 | De Bardonneche | A46B 9/021 | |
| 2019/0254407 A1 * | 8/2019 | Scalciarini | A46B 3/005 | |
| 2019/0281967 A1 * | 9/2019 | Castex | A46B 9/021 | |
| 2020/0008560 A1 * | 1/2020 | Kukreja | A45D 40/267 | |
| 2021/0076887 A1 * | 3/2021 | Chen | A46B 5/0083 | |
| 2021/0186183 A1 * | 6/2021 | Crapet | A45D 40/265 | |
| 2023/0130417 A1 * | 4/2023 | De Bardonneche | A46B 5/002 | 132/317 |

FOREIGN PATENT DOCUMENTS

| | | | | |
|---|---|---|---|---|
| EP | 1593320 A1 * | 11/2005 | | A45D 40/265 |
| EP | 3262977 A1 * | 1/2018 | | A45D 40/267 |
| FR | 2980677 A1 * | 4/2013 | | A45D 40/24 |
| FR | 2993151 A1 * | 1/2014 | | A45D 40/265 |
| FR | 3039382 A1 * | 2/2017 | | A46B 9/021 |
| FR | 3091981 A1 * | 7/2020 | | |
| GB | 2482759 A * | 2/2012 | | A45D 40/18 |
| KR | 20180086641 A * | 8/2018 | | |
| WO | WO-2011158173 A1 * | 12/2011 | | A45D 40/265 |
| WO | WO-2014102224 A1 * | 7/2014 | | A45D 34/045 |
| WO | WO-2016177827 A1 * | 11/2016 | | A45D 34/042 |
| WO | WO-2017212123 A1 * | 12/2017 | | A45D 40/264 |
| WO | WO-2018152191 A1 * | 8/2018 | | A45D 34/045 |
| WO | WO-2021009416 A1 * | 1/2021 | | |
| WO | WO-2021123335 A1 * | 6/2021 | | A45D 34/045 |

* cited by examiner

APPLICATOR FOR COSMETIC PRODUCT, IN PARTICULAR MASCARA, ASSOCIATED APPLICATOR ASSEMBLY AND METHOD FOR MANUFACTURING SUCH AN APPLICATOR

CROSS REFERENCE TO RELATED APPLICATIONS

This application claims priority under 35 U.S.C. § 119(a) to French patent application number 1900663, filed on Jan. 27, 2019, the entire teachings of which are incorporated herein by reference.

BACKGROUND OF THE INVENTION

Field of the Invention

The invention relates to an applicator for cosmetic product, in particular, mascara, and an associated applicator assembly. The invention also relates to a method for the manufacture of an applicator.

Description of the Related Art

Cosmetic product applicator assemblies conventionally include a container including a body forming a reservoir intended to contain the cosmetic product and an applicator for the cosmetic product.

There is a wide range of applicators featuring different designs and structures, each providing at least one specific and original application effect.

In particular, some applicators are used to apply a cosmetic product that is progressively released in the course of the application. In the case of mascara, this makes it possible to give an effect of volume to the eyelashes after application of the cosmetic product.

The cosmetic product can be stored inside/on the applicator. The dispensing of the cosmetic product is typically achieved by radial pressure on the applicator. This gesture may not be very pleasant for the user who has to press the applicator on the surface to be made up, such as the eyelashes, to extract the cosmetic product.

Therefore, there is a need for cosmetic product applicators that ensure a sufficient load of cosmetic product and a proper dispensing thereof, while being easy to use.

BRIEF SUMMARY OF THE INVENTION

The invention relates to an applicator for a cosmetic product including a first part and a second part that extend along a longitudinal direction of extension X from a proximal end towards a free distal end of the applicator, the first part and the second part being configured to form parts for applying the cosmetic product.

According to the invention, one of the parts is mounted mobile in translational with respect to the other of the parts, from at least a first retracted position to a second deployed position.

Also, according to the invention, the first and second parts are configured to form together a variable volume reservoir, intended to contain the cosmetic product and that has a first volume V1 when the parts occupy the first retracted position and a second volume V2 when the parts occupy the second deployed position.

In other words, in a deployed position, the applicator has a maximum length L, while a retracted position, the applicator has a minimum length 1.

Furthermore, it is possible to store cosmetic product in the variable volume reservoir, inside the reservoir delimited by the first and second parts of the applicator.

A simple back-and-forth motion drives the translation motion of the part the mobile, the mobile part sliding relative to the other part the fixed. This translation motion from the retracted position to the deployed position, and, back, releases the cosmetic product stored inside the reservoir.

This translational motion is easy to achieve for the user during the application of cosmetic product.

The user does not need to exert pressure on the surface that is to receive make-up in order to release the cosmetic product. Discomfort when applying make-up is thus advantageously limited for the user.

Furthermore, the translational motion also allows to suck the cosmetic product during the application thereof if the user feels that an excessive quantity has been dispensed. The user can therefore easily control the inlet and/or outlet of cosmetic product during the application.

According to different embodiments that can be taken together or separately:
- each of the parts is hollow, so as to feature an internal volume wherein the other part is nested,
- each of the parts is a single monolithic part,
- the applicator is produced without assembly operations,
- each of the parts includes two longitudinal branches delimiting the internal volume,
- the branches of the first part are alternated circumferentially with the branches of the second part,
- each of the first and second parts includes at least one opening arranged between two consecutive branches,
- the opening enables the passage of a branch of the other part,
- the opening has a width greater than the width of the branch passing through the opening so as to enable a rotational range of motion of the mobile part with respect to the other part,
- all or at least a part of the branches include at least one row of protrusions protruding and extending radially along the longitudinal extension X,
- the first part has a free distal end provided with protrusions,
- the first part has a free proximal end without protrusions,
- the proximal free end of the first part is arranged in the internal volume of the second part,
- second first part has a free distal end without protrusions,
- the distal free end of the second part is arranged in the internal volume of the first part,
- each of the branches extends from the distal end to the proximal end of each of the parts,
- the proximal end of the second part is configured to be secured to a rod of the applicator,
- the proximal end of the first part is free,
- the first part is mobile in translation with respect to the second part,
- the proximal end of the first part is configured to be secured to a rod of the applicator,
- the proximal end of the second part is free,
- the proximal end of the second part includes an orifice crossed by the proximal end of the first part,
- the second part is mobile in translation with respect to the first part,
- the protrusions are integrally formed with the branches,
- the applicator is produced by additive manufacturing.

The invention also relates to an applicator assembly for a cosmetic product, including a container including a body forming a reservoir intended to contain the cosmetic product, and an applicator for a cosmetic product such as defined above and adapted to be secured to the container, so that the applicator is housed inside the reservoir.

The invention finally relates to a method for manufacturing an applicator for a cosmetic product, in particular of mascara, such as defined above. The method includes a step of developing a digital model of the applicator, a step of manufacturing the applicator by means of the digital model.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

As shown in the different figures, the invention relates to an applicator 1 for a cosmetic product, in particular as shown here, for mascara.

Two embodiments are described here. The first embodiment is shown in FIGS. 2 to 9, and the second embodiment is shown in FIGS. 10 to 17.

The applicator 1 includes a first part 3 and a second part 5 that extend along a direction of longitudinal extension X from a proximal end 1a to a free distal end 1b.

The first part 3 and the second part 5 are respectively configured to form parts for applying the cosmetic product.

Each of the parts 3, 5 is a single monolithic part.

The applicator is produced without assembly operations. In other words, the applicator is not produced by assembly.

According to the invention, one of the parts 3, 5 is mounted mobile in translation with respect to the other of the parts 3, 5, from at least a first position, termed retracted, to a second position, termed deployed.

In a deployed position, the applicator has a maximum length L, while a retracted position, the applicator has a minimum length 1, as shown in FIGS. 2, 4, 10 and 12.

One of the parts 3, 5, termed mobile part, is therefore able to slide with respect to the other of the parts 3, 5, termed fixed part, between at least the first retracted position and second deployed position.

The first retracted position is shown in FIGS. 2, 3, 10 and 11, whereas the second deployed position is shown in FIGS. 4, 5, 12 and 13.

The first retracted position and the second deployed position constitute extreme positions between which one of the parts 3, 5, that is mobile, is able to occupy a plurality of intermediate positions.

An intermediate position is shown in FIGS. 6, 7, 14 and 15.

The first and second parts 3, 5 are configured to form together a variable volume reservoir 7a, 7b1, 7b2 intended to contain the cosmetic product.

The variable volume reservoir 7a, 7b1, 7b2 has a first volume V1 when the parts 3, 5 occupy the first retracted position and a second volume V2 when the parts 3, 5 occupy the second deployed position.

Furthermore, the reservoir 7a, 7b1, 7b2 includes a first storage zone 7a and a second storage zone 7b1, 7b2.

The first storage zone 7a, also termed central storage zone, is located at the centre of the applicator, between the proximal end 3a of the first part 3 and the distal end 5b of the second part 5.

The central storage zone 7a has a minimum volume when the applicator 1 is in the deployed position and a maximum volume when the applicator 1 is in the retracted position.

The second storage zone 7b1, 7b2 includes at least one region, termed first region 7b1, that is located at the distal end 1b of the applicator 1 between the distal parts 3b and 5b of the first and second parts 3, 5.

The at least one first region 7b1 of the second storage zone 7b1, 7b2 has a minimum volume when the applicator 1 is in the retracted position and a maximum volume when the applicator 1 is in the deployed position.

In each of the two embodiments shown in the figures, each of the parts 3, 5 of the applicator 1 is hollowed so as to have an internal volume.

The internal volume of each of the parts 3, 5 is thus delimited by at least two longitudinal branches 9.1, 9.2 that extend from the distal end 1b to the proximal end 1a and by at least two openings 11.1, 11.2 arranged between two consecutive branches 9.1, 9.2.

This arrangement of the branches 9.1, 9.2 and of the openings 11.1, 11.2 enables each of the parts 3, 5 to be nested in the internal volume of the other part, a branch 9.1, 9.2 of one part 3, 5 passing through the opening 11.1, 11.2 of the other part 3, 5.

The first part 3 and the second part 5 of the applicator 1 are inserted into, are nested in one another, each of the branches 9.1, 9.2 of one of the parts 3, 5 extending through one of the openings 11.1, 11.2 of the other.

The branches 9.1 of the first part 3 are alternated with the branches 9.2 of the second part 5 circumferentially around the direction of longitudinal extension X.

This arrangement advantageously have an applicator without a central core extending along the direction of longitudinal extension X from a proximal end towards a distal end, as is the case with conventional applicators.

The two embodiments shown here differ from that of the parts 3, 5 constituting the mobile part of the applicator 1.

First Embodiment

In the first embodiment shown in FIGS. 2 to 9, the mobile part is the first part 3, the first part 3 being mounted mobile relative to the second part 5, considered as fixed.

Preferably, the first part 3 has a generally oblong shape and extends along the direction of longitudinal extension X from a free proximal end 3a shaped like an ogive, towards a spherical free distal end 3b.

The radius of curvature of the distal end 3b is thus greater than the radius of curvature of the proximal end 3a.

The first part 3 is hollowed so as to have an internal volume.

This internal volume is delimited by longitudinal branches 9.1, for example here five in number, that extend from the distal end 3b to the proximal end 3a, where they join one another.

The first part 3 further includes openings 11.1 that are each arranged between two consecutive branches 9.1. These openings 11.1 generally form slots that extend longitudinally.

Advantageously, the first part 3 thus includes five openings 11.1 alternating with the five branches 9.1.

In the embodiment shown here, each branch 9.1 includes a row of protrusions 13 protruding and extending radially along the longitudinal extension X.

In other embodiments not shown, the branches 9.1 can include one or several rows of protrusions 13. The number of rows can vary from one branch 9.1 to the other.

Advantageously, the protrusions 13 are integrally formed with the branches 9.1 of the first part 3, made of a single part with the branches 9.1.

Preferably, the protrusions 13 extend orthogonally to the longitudinal extension X.

In other embodiments not shown, the protrusions 13 can be inclined towards the proximal 1a and/or distal 1b ends of the applicator 1.

The spherical free distal end 3b is also provided with protrusions 13.

The protrusions 13 extend protruding orthogonally to the surface of the end so as to be enclosed in a spherical envelope S.

The protrusions 13 are organised in longitudinal rows, some of which are aligned with the branches 9.1, the others being aligned with the openings 11.1.

The proximal end 3a is not provided with protrusions 13.

The second part 5, here fixed, has a generally oblong shape and extends along the direction of longitudinal extension X from a proximal end 5a towards a free distal end 5b.

Preferably, the free distal end 5b is shaped like an ogive.

The proximal end 5a is connected to a sleeve 15 configured to be secured to a rod 17 of an application assembly 19.

The second part 5 is hollowed so as to have an internal volume.

This internal volume is delimited by longitudinal branches 9.2, for example here five in number, that extend from the distal end 5b to the proximal end 5a, i.e. from the distal end 5b towards the sleeve 15.

The second part 5 further includes openings 11.2 arranged between two consecutive branches 9.2. These openings 11.2 generally form slots that extend longitudinally.

The second part 5 thus includes five openings 11.2 alternating with the five branches 9.2.

In the embodiment shown here, each branch 9.2 includes a row of protrusions 13 protruding and extending radially along the longitudinal extension X.

In other embodiments not shown, the branches 9.2 can include one or several rows of protrusions 13. The number of rows can vary from one branch 9.2 to the other.

Advantageously, the protrusions 13 are integrally form with the branches 9.2 of the second part 5, made of a single part with the branches 9.2.

Preferably, the protrusions 13 extend transversally orthogonally to the longitudinal extension X.

In other embodiments not shown, the protrusions 13 can be inclined towards the proximal 1a and/or distal 1b ends of the applicator 1.

The distal end 5b and the proximal end 5a of the second part 5 are not provided with protrusions 13.

In this first embodiment, on each of the first and second parts 3, 5, the protrusions 13 are conical.

In a transversal direction, orthogonal to the direction of longitudinal extension X, the dimensions of the protrusions 13 are greater in the vicinity of an end 131 forming a base secured to the branch 9.1, 9.2 than in the vicinity of the free end 132 of the protrusion 13. In other words, the protrusion 13 transversally has a section that diminishes from the end 131 towards the free end 132.

As described previously, each of the parts 3, 5 is hollow, so as to have an internal volume in which the other part 3, 5 is nested.

Each of the parts 3, 5 is a single monolithic part.

The applicator is produced without assembly operations. In other words, the applicator is not produced by assembly.

Thus, the branches 9.1 of the first part 3 alternate circumferentially with the branches 9.2 of the second part 5 and the openings 11.1, 11.2 of one of the parts 3, 5 enable the passage of the branches 9.1, 9.2 of the other part 5, 5 and conversely.

The proximal end 3a of the first part 3 is arranged in the internal volume of the second part 5 and the distal end 5b of the second part 5 is arranged in the internal volume of the first part 3.

In this first embodiment of the applicator 1 and according to the invention, the first part 3 is mounted mobile in translation with respect to the second part 5 from the first position, termed retracted, to the second position, termed deployed.

Figure 2:
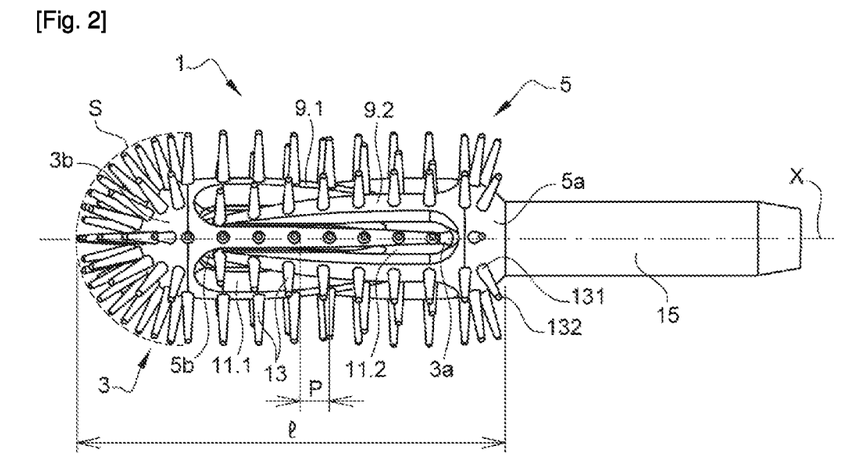
FIG. 2 is a side view of an applicator according to a first embodiment of the invention in a first retracted position.
Figure 3:
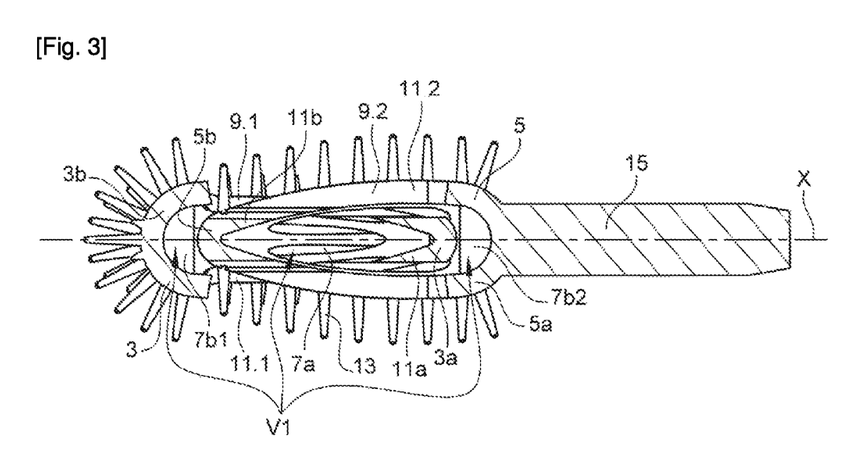
FIG. 3 is a longitudinal cross-section view of the applicator of FIG. 2.
Figure 4:
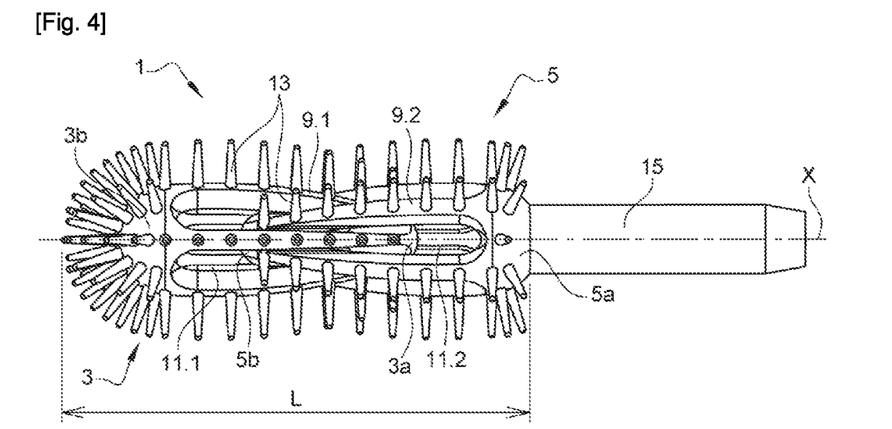
FIG. 4 is a side view of the applicator of FIG. 2 in a second deployed position.
Figure 5:
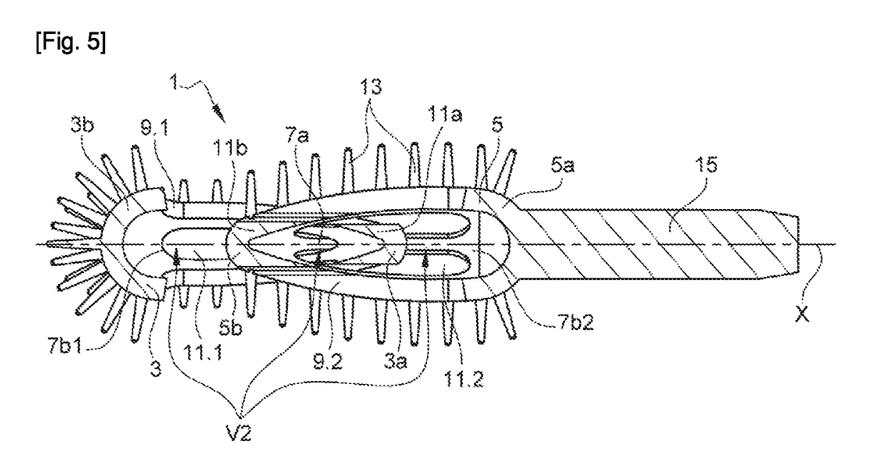
FIG. 5 is a longitudinal cross-section view of the applicator of FIG. 4.
Figure 6:
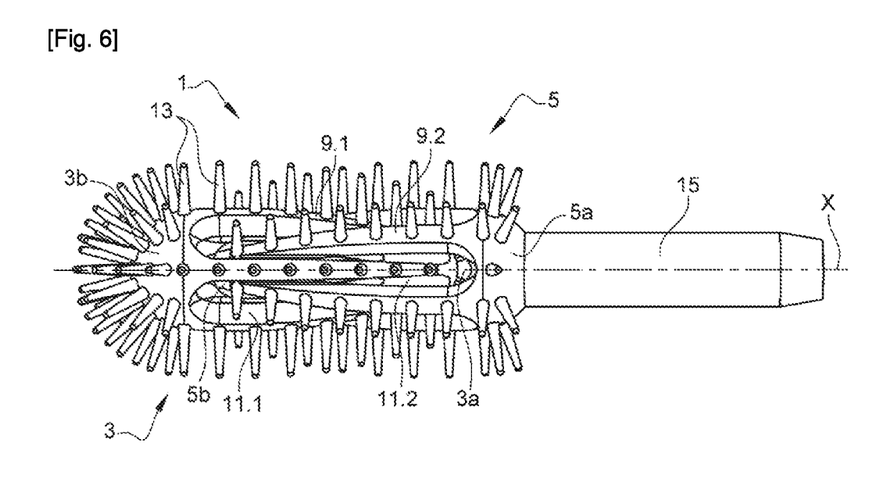
FIG. 6 is a side view of the applicator of FIG. 2 in an intermediate position.
Figure 7:
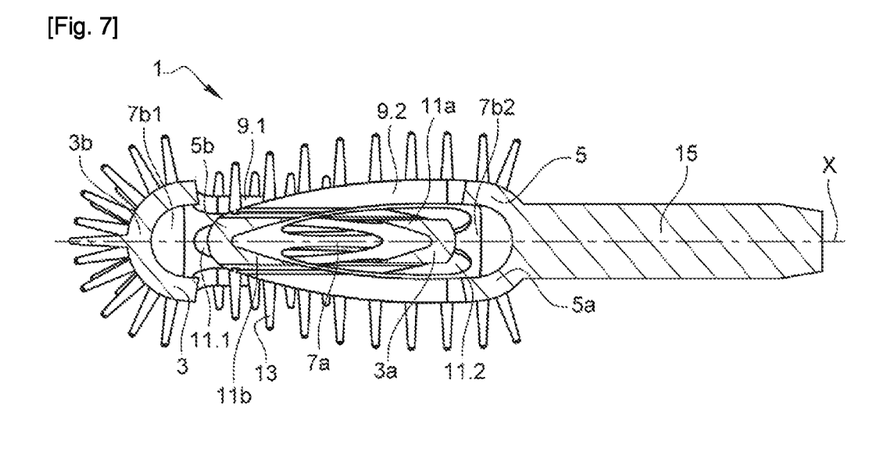
FIG. 7 is a longitudinal cross-section view of the applicator of FIG. 6.
Figure 8:
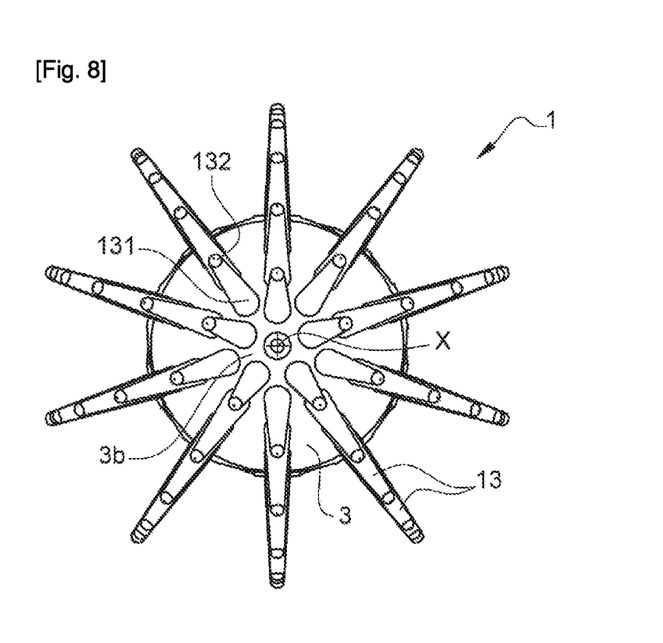
FIG. 8 is a front view along the longitudinal direction X of the applicator of FIG. 2.
Figure 9:
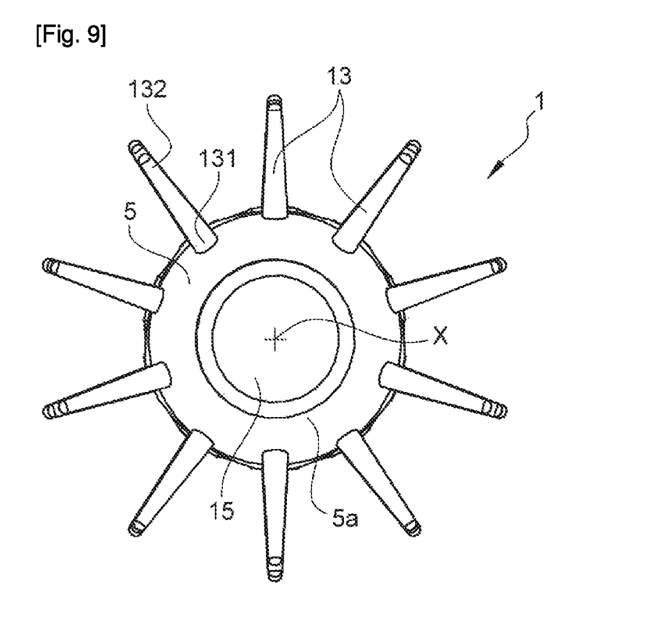
FIG. 9 is an end view along the longitudinal direction X of the applicator of FIG. 2.

The first retracted position is shown in FIGS. 2 and 3, whereas the second deployed position is shown in FIGS. 4 and 5. An intermediate position is also shown in FIGS. 6 and 7.

The first and second parts 3, 5 are configured to form internally a variable volume reservoir 7a, 7b1, 7b2 intended to contain the cosmetic product.

The variable volume reservoir 7a, 7b1, 7b2 thus has a first volume V1 when the parts 3, 5 occupy the first retracted position and a second volume V2 when the parts 3, 5 occupy the second deployed position.

As mentioned above, the reservoir 7a, 7b1, 7b2 includes a first storage zone 7a and a second storage zone 7b1, 7b2.

The first storage zone 7a, also termed central storage zone, is located at the centre of the applicator, between the proximal end 3a of the first part 3 and the distal end 5b of the second part 5.

In this first embodiment, the second storage zone 7b1, 7b2 is divided into two regions 7b1 and 7b2, each located at one of the ends 1a, 1b of the applicator 1. Thus, a first region 7b1 is located between the distal parts 3b and 5b of the first and second parts 3, 5. A second region 7b2 is located between the proximal parts 3a and 5a of the first and second parts 3, 5.

In this embodiment, the openings 11.1, 11.2 in the form of slots of a part 3, 5 constitute means to guide the branches 9.1, 9.2 of the other part 3, 5.

In the retracted position shown in FIGS. 2 and 3, the variable volume reservoir 7a, 7b1, 7b2 is at its volume V1. The proximal end 3a of the first part 3 and the distal end 5b of the second part 5 are nested in one another internal volume of the other part 3, 5 so that the distal end 3b of the first part 3 is as close as possible to the distal end 5b of the second part 5 and so that the proximal end 5a of the second part 5 is as close as possible to the proximal end 3a of the first part 3. In this position, the central storage zone 7a has a maximum volume and each of the regions 7b1, 7b2 of the second storage zone 7b1, 7b2 has a minimum volume, as shown in FIG. 3.

In the deployed position shown in FIGS. 4 and 5, the variable volume reservoir 7a, 7b1, 7b2 is at its volume V2. The proximal end 3a of the first part 3 and the distal end 5b of the second part 5 are nested in one another internal volume of the other part 3, 5 so that the proximal end 3a of the first part 3 is as close as possible to the distal end 5b of the second part 5. In this position, the central storage zone 7a has a minimum volume and each of the regions 7b1, 7b2 of the second storage zone 7b1, 7b2 has a maximum volume, as shown in FIG. 5.

During the translational motion of the first part 3 from the retracted position to the deployed position, the proximal end 3a of the first part 3 and the distal end of the first part 3 move respectively away from the proximal end 5a of the second part 5 and from the distal end 5b of the second part 5.

The translational motion is performed until the proximal ends 11a of the opening 11.1 of the first part 3 come into contact with the distal ends 11b of the opening 11.2 of the second part 5 forming the abutment means. The central storage zone 7a that had a maximum volume now has a minimum volume and each of the regions 7b1, 7b2 of the second storage zone 7b1, 7b2 that had a minimum volume now has a maximum volume. A transfer of volume is thus observed from the central storage zone 7a to the second storage zone 7b1, 7b2.

Advantageously, during the motion of the first mobile part 3 from the retracted position towards the deployed position of the applicator, the cosmetic product stored in the central storage area 7a is pushed out of the reservoir 7a, 7b1, 7b2, in particular through the openings 11.1, 11.2.

Furthermore, when passing from the retracted position to the deployed position, the motion of the first part 3, which is movably mounted, causes a piston effect and the filling by suction of the variable volume reservoir 7a, 7b1, 7b2, in particular at the level of the second storage area 7b1, 7b2.

The translational motion towards the deployed position can be observed when the applicator 1 exits of a container 21 of the applicator assembly 19 containing the cosmetic product, when the first part 3 is retained, in particular by friction, during the passage of a neck 23 of the container 21 of the applicator assembly 19.

This translational motion from the deployed position is also influenced by gravity when the applicator 1 is out of the container. The variable volume reservoir 7 of the applicator 1 is thus loaded to its maximum.

During the passage from the deployed position to the retracted position, the reservoir 7a, 7b1, 7b2 is initially at its volume V2.

The proximal end 3a of the first end 3 and the distal end 5b of the second part 5 that are already arranged in the internal volume of the other part 3, 5 penetrate a little deeper in this internal volume. In other words, the proximal end 3a of the first part 3 comes closer to the proximal end 5a of the second part 5 and the distal end 5b of the second part 5 comes closer to the distal end 3b of the first part 3.

The central storage zone 7a that had a minimum volume now has a maximum volume and each of the regions 7b1, 7b2 of the second storage zone 7b1, 7b2 that had a maximum volume now has a minimum volume. A transfer of volume is thus observed from the second storage zone 7b1, 7b2 towards the central storage zone 7a.

This change of volume during the translational motion from one position to the other causes the inlet and/or outlet of the cosmetic product through the openings 11.1, 11.2.

Advantageously, this translational motion occurs because of the application of the cosmetic product when the user does a back-and-forth motion on the surface to be made up, in particular by retaining one of the parts from the surface to be made up.

During the application of the cosmetic product, it can also be interesting to perform a translational motion so as to pass from the retracted position to the deployed position, and conversely, to allow to suck the cosmetic product and to distribute it inside the variable volume reservoir 7a, 7b1, 7b2, to then repeat a translational motion to the retracted position to expel the product from the reservoir 7a, 7b1, 7b2, thereby using the remaining product. It is thus possible to use a maximum of cosmetic product and to continue the application without having to plunge again the applicator 1 in the container 21.

In the two embodiments shown, the eyelashes, thanks to the protrusions 13, retain the mobile part and enable its translational motion causing the inlet and/or outlet of the cosmetic product.

Furthermore, in the case of an applicator 1 provided with protrusions 13 as shown here, when passing from the deployed position to the retracted position and vice versa from the retracted position to the deployed position, the translational motion varies the pitch "p" of the protrusions 13 from a branch 9.1, 9.2 to the consecutive branch 9.1, 9.2

Figure 18A:
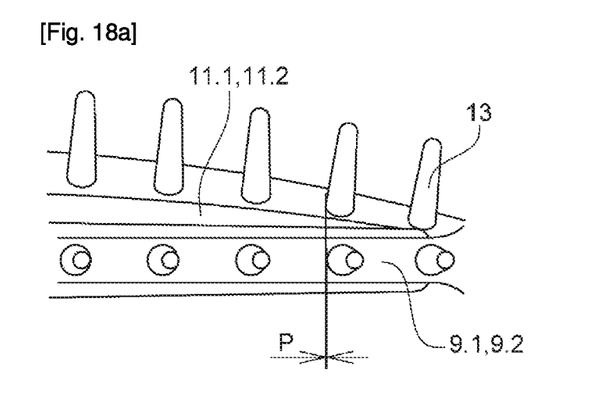
FIG. 18a is a detailed view of the applicator of FIGS. 2 and 10.
Figure 18B:
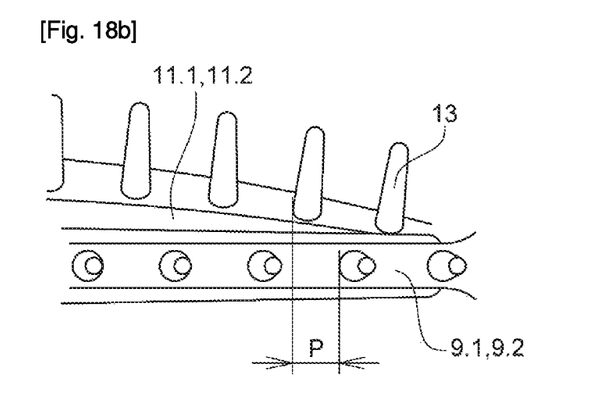
FIG. 18b is a detailed view of the applicator of FIGS. 6 and 14.
Figure 18C:
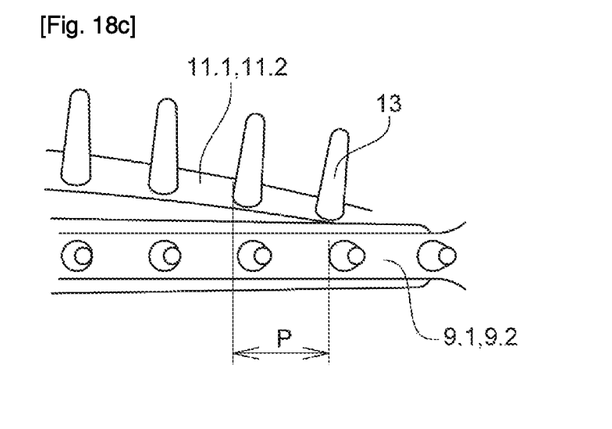
FIG. 18c is a detailed view of the applicator of FIGS. 4 and 12.

The term "pitch" is here used to describe the spacing in a given position (deployed, retracted, intermediate) between a first protrusion 13 of a branch of the mobile part 3 and a second protrusion 13 of a consecutive branch of the fixed part 3, as shown in FIGS. 18a, 18b and 18c. The pitch p is measured from the base of the protrusions 13, this spacing ranging from 0 mm and 2 mm.

The pitch is 0 mm when the two protrusions 13 are aligned, as shown in FIG. 18a, and the pitch is at its maximum when the protrusion 13 of the mobile part is aligned with the subsequent protrusion 13, as shown in FIG. 18c.

This variation of pitch causes a shearing of the eyelashes caught among the protrusions, so as to coat them with a maximum of cosmetic product and thereby to increase the volume effect. The eyelashes can also be stretched when caught between two protrusions, which facilitates combing thereof.

Furthermore, the openings 11.1, 11.2 can have a width greater than the width of the branch 9.1, 9.2 passing through the opening 11.1, 11.2, as shown in the figures.

This difference of size on the one hand facilitates the translational motion of the mobile part, which can be retained by the presence of cosmetic product, here of the first part 3 with respect to the second part 5.

Furthermore, this size difference enables a rotational range of motion of the mobile part 3, 5 with respect to the other part 3, 5.

As with the translational motion, this motion of rotation contributes to dispensing the cosmetic product present in the reservoir 7a, 7b1, 7b2 with a variable volume. It also reinforces the shearing of the eyelashes, which adds to the enhancement of the volume effect.

Second Embodiment

In the second embodiment, shown in FIGS. 10 to 17, the mobile part of the applicator 1 is made from the second part 5, the first part 3 being considered as fixed.

The first and second parts 3, 5 have structures that are similar to that of the first and second parts 3, 5 of the first embodiment.

Similarly, the functioning and use of the applicator 1 according to the second embodiment are similar to that described in the first embodiment.

Consequently, this second embodiment is in particular described by comparison with the first embodiment.

The first part 3, which is fixed in this case, has a generally oblong shape and extends along the direction of longitudinal extension X from a proximal end 3a shaped like an ogive, towards a spherical free distal end 3b.

The radius of curvature of the distal end 3b is thus greater than the radius of curvature of the proximal end 3a.

The proximal end 3a of the first part 3 is connected to a sleeve 15 by means of a stem 25, the sleeve 15 being configured to be secured to a rod 17 of the applicator assembly 19.

The first part 3 is hollowed so as to have an internal volume.

This internal volume is delimited by five longitudinal branches 9.1 that extend from the distal end 3b to the proximal end 3a, i.e. from the distal end 3b towards the stem 25 where they join with one another.

The first part 3 further includes openings 11.1 arranged between two consecutive branches 9.1. These openings together 11.1 form slots.

The first part 3 thus includes five openings 11.1 alternating with the five branches 9.1.

In the embodiment shown here, each branch 9.1 includes a row of protrusions 13 protruding and extending radially along the longitudinal extension X.

In other embodiments (not shown), the branches 9.1 can include one or several rows of protrusions 13. The number of rows can vary from one branch 9.1 to the other.

The protrusions 13 are integrally formed with the branches 9.1 of the first part 3, made of a single part with the branches 9.1.

Preferably, the protrusions 13 extend transversally orthogonally to the longitudinal extension X.

In other embodiments not shown, the protrusions 13 can be inclined towards the proximal 1a and/or distal 1b ends of the applicator 1.

The spherical free distal end 3b is advantageously also provided with protrusions 13.

The protrusions 13 extend protruding orthogonally to the surface of the end so as to be enclosed in a spherical envelope S. The protrusions 13 are organised in longitudinal rows, some of which are aligned with the branches 9.1, the others being aligned with the openings 11.1.

The proximal end 3a and the stem 25 are not provided with protrusions 13.

The second part 5, here mobile, has a generally oblong shape and extends along the direction of longitudinal extension X from a proximal end 5a towards a free distal end 5b that is shaped like an ogive.

The proximal end 5a includes an orifice 27 intersected longitudinally by the proximal end 3a of the first part 3, more accurately intersected by the stem 25 connecting the proximal end 3a to the sleeve 15.

The second part 5 is hollowed so as to have an internal volume.

This internal volume is delimited by five longitudinal branches 9.2 that extend from the distal end 5b to the proximal end 5a.

The second part 5 further includes openings 11.2 arranged between two consecutive branches 9.2. These openings generally 11.2 form slots.

The second part 5 thus includes five openings 11.2 alternating with the five branches 9.2.

In the embodiment shown here, each branch 9.2 includes a row of protrusions 13 protruding and extending radially along the longitudinal extension X.

In other embodiments not shown, the branches 9.2 can include one or several rows of protrusions 13. The number of rows can vary from one branch 9.2 to the other.

The protrusions 13 are integrally formed with the branches 9.2 of the second part 5, made of a single part with the branches 9.2.

Preferably, the protrusions 13 extend transversally orthogonally to the longitudinal extension X.

In other embodiments not shown, the protrusions 13 can be inclined towards the proximal 1a and/or distal 1b ends of the applicator 1.

The distal end 5b and the proximal end 5a are not provided with protrusions 13.

In this embodiment, on each of the first and second parts 3, 5, the protrusions 13 are conical. In a transversal direction, orthogonal to the direction of longitudinal extensions X, the dimensions of the protrusions 13 are greater in the vicinity of an end 131 forming a base secured to the branch 9.1, 9.2 than in the vicinity of the free end 132 of the protrusion 13. In other words, the protrusion 13 transversally has a section that diminishes from the end 131 towards the free end 132.

As described previously, each of the parts 3, 5 is hollow, so as to have an internal volume in which the other part 3, 5 is nested.

Each of the parts 3, 5 is a single monolithic part.

The applicator is produced without assembly operations. In other words, the applicator is not produced by assembly.

Thus, the branches 9.1 of the first part 3 alternate circumferentially with the branches 9.2 of the second part 5 and the openings 11.1, 11.2 of one of the parts 3, 5 enable the passage of the branches 9.1, 9.2 of the other part 5, 5 and conversely.

The proximal end 3*a* of the first part 3 is arranged in the internal volume of the second part 5 and the distal end 5*b* of the second part 5 is arranged in the internal volume of the first part 3.

In this second embodiment and according to the invention, the second part 5 is mounted mobile in translation with respect to the first part 3 from the first position, termed retracted, to the second position, termed deployed.

Figure 10:
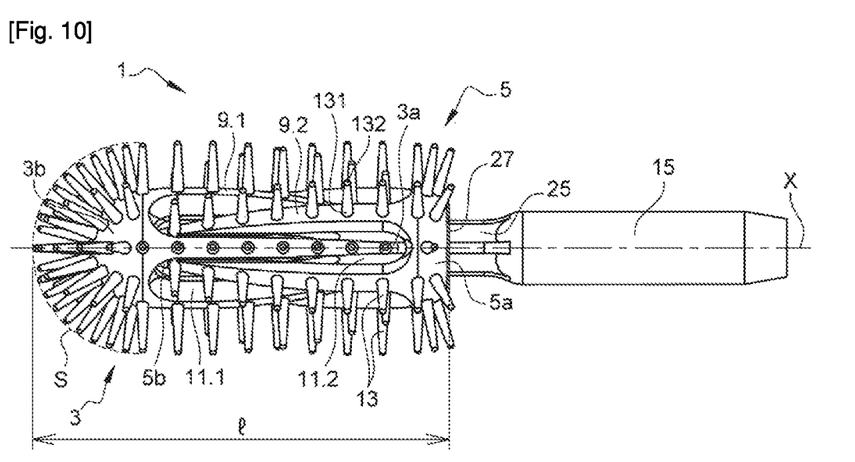
FIG. 10 is a side view of an applicator according to a second embodiment of the invention in a first retracted position.
Figure 11:
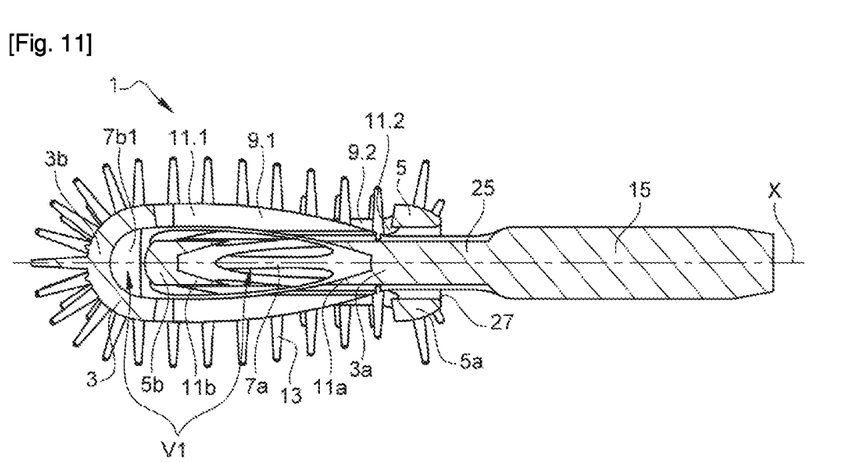
FIG. 11 is a longitudinal cross-section view of the applicator of FIG. 10.
Figure 12:
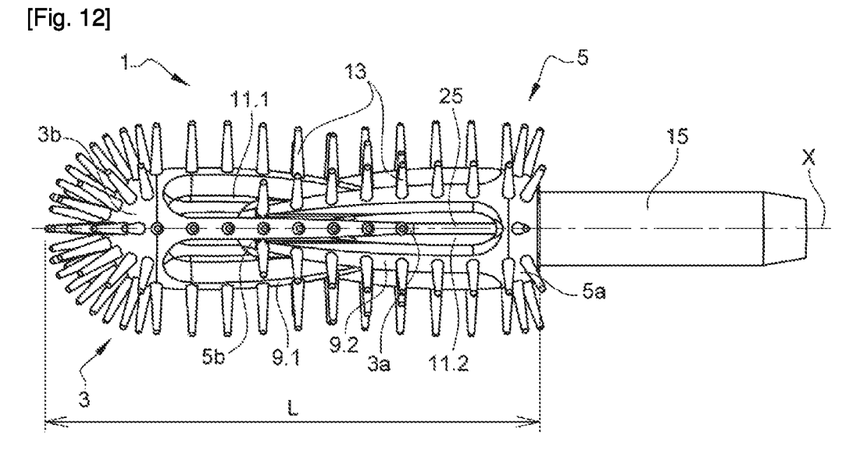
FIG. 12 is a side view of the applicator of FIG. 10 in a second deployed position.
Figure 13:
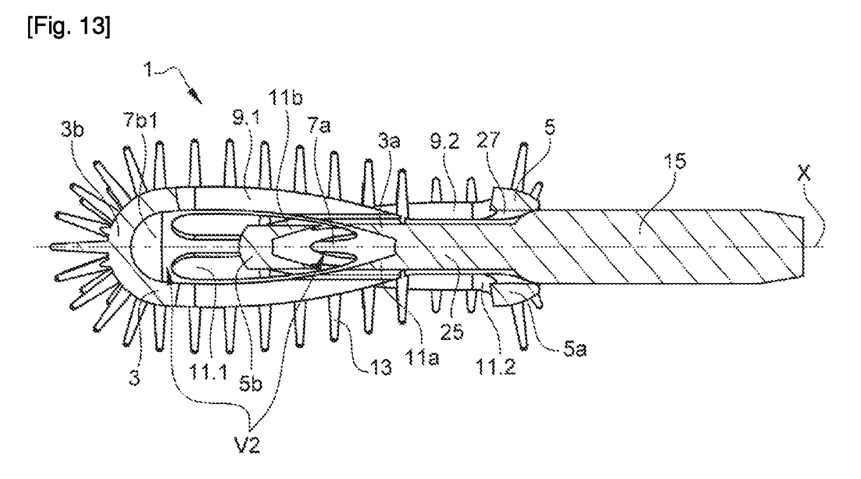
FIG. 13 is a longitudinal cross-section view of the applicator of FIG. 12.
Figure 14:
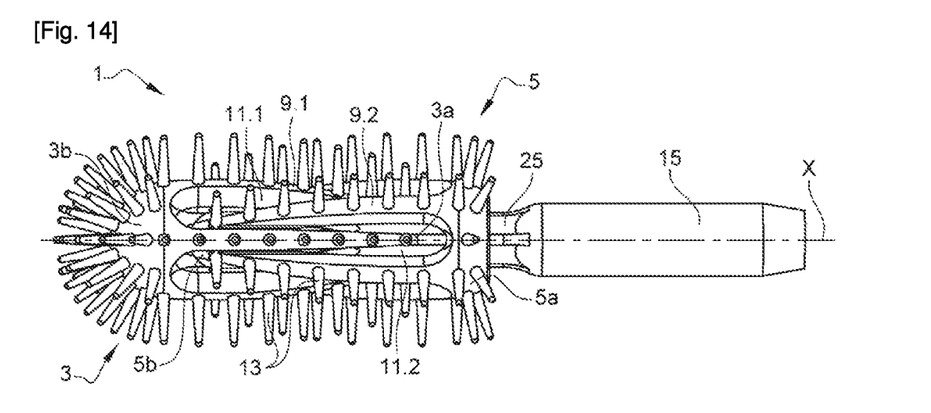
FIG. 14 is a side view of the applicator of FIG. 10 in an intermediate position.
Figure 15:
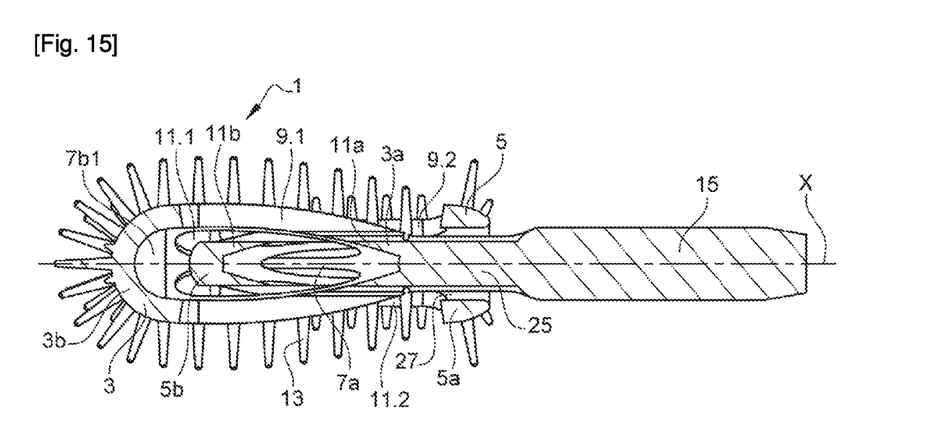
FIG. 15 is a longitudinal cross-section view of the applicator of FIG. 14.
Figure 16:
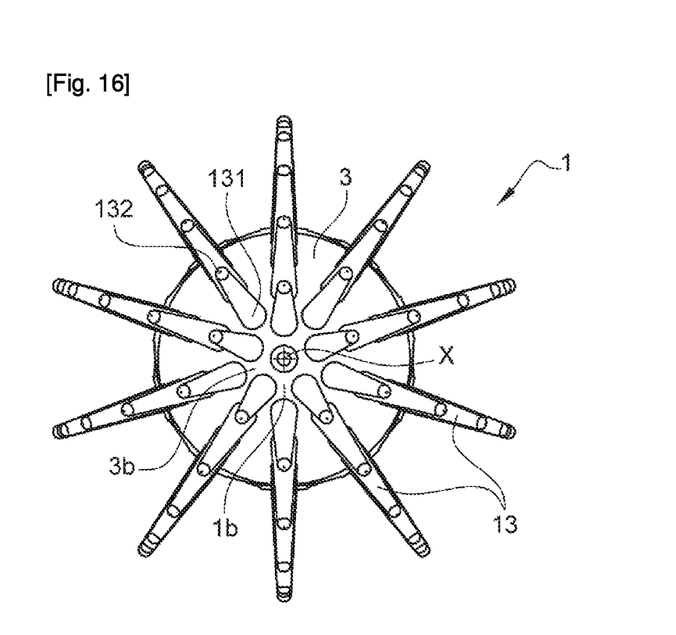
FIG. 16 is a front view along the longitudinal direction X of the applicator of FIG. 10.
Figure 17:
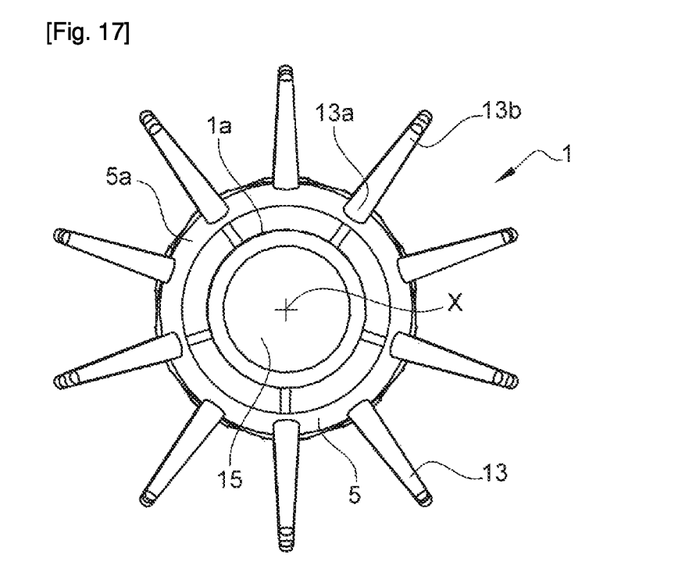
FIG. 17 is an end view along the longitudinal direction X of the applicator of FIG. 10.

The first retracted position is shown in FIGS. 10 and 11, whereas the second deployed position is shown in FIGS. 12 and 13. An intermediate position is also shown in FIGS. 14 and 15.

According to the invention, the first and second parts 3, 5 are configured to form together internally a variable volume reservoir 7*a*, 7*b*1, 7*b*2 intended to contain the cosmetic product.

The variable volume reservoir 7*a*, 7*b*1, 7*b*2 thus has a first volume V1 when the parts 3, 5 occupy the first retracted position and a second volume V2 when the parts 3, 5 occupy the second deployed position.

As mentioned above, the reservoir 7*a*, 7*b*1, 7*b*2 includes a first storage zone 7*a* and a second storage zone 7*b*1, 7*b*2.

The first storage zone 7*a*, also termed central storage zone, is located at the centre of the applicator, between the proximal end 3*a* of the first part 3 and the distal end 5*b* of the second part 5.

In this second embodiment, the second storage zone 7*b*1 includes a single region 7*b*1, located at the distal end 1*b* of the applicator 1. This region 7*b*1 is located between the distal parts 3*b* and 5*b* of the first and second parts 3, 5.

In this second embodiment, the openings 11.1, 11.2 in the form of slots of a part 3, 5 advantageously constitute means to guide the branches 9.1, 9.2 of the other part 3, 5.

In the retracted position shown in FIGS. 10 and 11, the variable volume reservoir 7*a*, 7*b*1, 7*b*2 is at its volume V1. The proximal end 3*a* of the first part 3 and the distal end 5*b* of the second part 5 are nested in one another internal volume of the other part 3,5 so that the distal end 3*b* of the first part 3 is as close as possible to the distal end 5*b* of the second part 5 and so that the proximal end 5*a* of the second part 5 is as close as possible to the proximal end 3*a* of the first part 3.

In this position, the central storage zone 7*a* has a maximum volume and the region 7*b*1 of the second storage zone 7*b*1, 7*b*2 has a minimum volume, as shown in FIG. 11.

In the deployed position shown in FIGS. 12 and 13, the variable volume reservoir 7*a*, 7*b*1, 7*b*2 is at its volume V2. The proximal end 3*a* of the first part 3 and the distal end 5*b* of the second part 5 are nested in one another internal volume of the other part 3,5 so that the proximal end 3*a* of the first part 3 is as close as possible to the distal end 5*b* of the second part 5. In this position, the central storage zone 7*a* has a minimum volume and the region 7*b*1 of the second storage zone 7*b*1, 7*b*2 has a maximum volume, as shown in FIG. 13.

During the translational motion of the second part 5 from the retracted position to the deployed position, the proximal end 5*a* of the second part 5 and the distal end of the second part 5 move respectively away from the proximal end 3*a* of the first part 3 and from the distal end 3*b* of the first part 3.

The translational motion is performed until the proximal end 5*a* of the second part 5 comes into contact with the sleeve 15 and/or until the distal ends 11*b* of the openings 11.2 of the second part 5 come into contact with the proximal ends 11*a* of the openings 11.1 of the first part 3 that constitute the abutment means as can be seen in FIG. 13.

The central storage zone 7*a* that had a maximum volume now has a minimum volume and the region 7*b*1 of the second storage zone 7*b*1, 7*b*2 that had a minimum volume now has a maximum volume. A transfer of volume is thus observed from the central storage zone 7*a* to the second storage zone 7*b*1, 7*b*2, and in particular to the region 7*b*1.

Advantageously, during the motion of the second mobile part 5 from the retracted position towards the deployed position of the applicator, the cosmetic product stored in the central storage area 7*a* is pushed out of the reservoir 7*a*, 7*b*1, 7*b*2, in particular through the openings 11.1, 11.2.

Furthermore, when passing from the retracted position to the deployed position, the translational motion of the first second 5, which is movably mounted, causes a piston effect and the filling by suction of the variable volume reservoir 7*a*, 7*b*1, 7*b*2, in particular at the level of region 7*b*1 of the second storage area 7*b*1, 7*b*2.

This motion can be observed when the applicator 1 enters the container 21 of the applicator assembly 19 containing the cosmetic product, when the second part 5 is retained, in particular by friction, during the passage of a neck 23.

During the passage from the deployed position to the retracted position, the reservoir 7*a*, 7*b*1, 7*b*2 is initially at its volume V2.

The proximal end 3*a* of the first end 3 and the distal end 5*b* of the second part 5 that are already arranged in the internal volume of the other part 3, 5 then penetrate a little deeper in this internal volume.

In other words, the distal end 5*b* of the second part 5 moves closer to the distal end 3*b* of the first part 3.

The central storage zone 7*a* that had a minimum volume now has a maximum volume and the region 7*b*1 of the second storage zone 7*b*1, 7*b*2 that had a maximum volume now has a minimum volume. A transfer of volume is thus observed from the region 7*b*1 of the second storage zone 7*b*1, 7*b*2 towards the central storage zone 7*a*.

This change of volume during the motion in translation from a position to the other causes inlet and/or outlet of the cosmetic product through the openings 11.1, 11.2.

Advantageously, this translational motion occurs because of the application of the cosmetic product when the user does a back-and-forth motion on the surface to be made up, in particular by retaining one of the parts from the surface to be made up.

It can be interesting to perform these translation motions during the application of the cosmetic product to enable the distribution of the cosmetic product once again inside the variable volume reservoir 7*a*, 7*b*1, 7*b*2 so as to continue the application while still having product available without the need to plunge again the applicator 1 in the container 21.

In the embodiment shown here, the eyelashes, thanks to the protrusions 13, retain the mobile part and enable its translational motion causing the inlet and/or outlet of the cosmetic product.

This motion is also facilitated when the applicator 1 is inserted in the container 21.

Furthermore, in the case of an applicator 1 provided with protrusions 13 as shown here, when passing from the deployed position to the retracted position, the translational motion varies the pitch "p" of the protrusions 13 from a branch 9.1, 9.2 to another branch 9.1, 9.2.

The definition of "pitch" and the notion of pitch variation are different from that explained for the first embodiment and shown in FIGS. 18*a*, 18*b* and 18*c*.

This variation of pitch causes a shearing of the eyelashes caught among the protrusions, so as to coat them with a maximum of cosmetic product and thereby to increase the volume effect. The eyelashes can also be stretched when caught between two protrusions, which facilitates combing thereof.

Furthermore, the openings 11.1, 11.2 can have a width greater than the width of the branch 9.1, 9.2 passing through the opening 11.1, 11.2, as shown in the figures.

This difference of size on the one hand facilitates the translational motion of the mobile part, which can be retained by the presence of cosmetic product, here of the second part 5 with respect to the first part 3.

Furthermore, this size difference enables a rotational range of motion of the mobile part that is mounted mobile with respect to the other part.

As with the translational motion, this rotational motion helps dispensing the cosmetic product present in the variable volume reservoir 7*a*, 7*b*1, 7*b*2. It also reinforces the shearing of the eyelashes, which adds to the enhancement of the volume effect.

In other embodiments, not shown, it is possible to envisage that each of the parts 3, 5 includes from two to six branches 9.1, 9.2 and from two to six openings 11.1, 11.2. The width of the branches 9.1, 9.2 and of the openings 11.1, 11.2 depends on their number, while taking into account the fact that the width of the openings 11.1, 11.2 depends on the width of the branches 9.1, 9.2.

It is therefore possible to envisage an applicator 1, of which each part 3, 5 includes two wide branches 9.1, 0.2 that are nested in the wide openings 11.1, 11.2 of the other part 3, 5. Preferably, each of the branches 9.1, 9.2 includes a plurality of longitudinal rows of protrusions 13.

It is possible to envisage that the branches 9.1, 9.2 and therefore the openings 11.1, 11.2 do not all have the same width. The applicator 1 can therefore have wide branches 9.1, 0.2 alternating with narrow branches 9.1, 9.2.

The example embodiments shown here feature for example ten longitudinal rows, this number of longitudinal rows being variable depending on the angular distance chosen between the longitudinal rows.

The angular distance is in the range [10°; 90°]; it is therefore for example, approximately 36°.

It can also be envisaged in another embodiment, not shown, that the applicator does not include a protrusion. Preferably, this is a gloss applicator for lips or skin care products, for example. The translational motion of the mobile part causes a change of the volume of the reservoir 7*a*, 7*b*1, 7*b*2 with in particular a transfer of volume from the first storage zone 7*a* to the second storage zone 7*b*1, 7*b*2 and vice versa. This modification of volume regulates the dispensing of the cosmetic product to be applied. By passing from the deployed position to the retracted position, and conversely, the user can cause the inlet and/or outlet of the cosmetic product.

It should also be noted that the applicator 1 advantageously forms a brush.

Preferably, the applicator 1 described above is made by means of an additive manufacturing method.

The term "additive manufacturing" describes a manufacturing method, generally computer-assisted, whereby matter is added. This type of process is also called three-dimensional printing or 3D printing.

The use of 3D printing manufactures the applicator 1 in a single part, as two parts nested in one another, one of the parts being mobile with respect to the other. Such an applicator 1 can be very complex, and even impossible to create by a conventional injection moulding process. It is therefore possible to create, directly and with a single manufacturing operation, the applicator 1 in two parts. Furthermore, this technique makes it possible to work without having to use complex moulds.

Different additive manufacturing technologies known to the person skilled in the art can be used. In particular, this technology can be:

Fused deposition modelling (FDM),
Selective Laser Melting (SLM),
Selective Laser Sintering (SLS),
Electron Beam Melting (EBM),
Stereo-lithography Apparatus (SLA),
Laminated Object Manufacturing (LOM).

Preferably, sintering and/or stereo-lithography technologies are used.

This invention also relates to a method for manufacturing an applicator 1 as described above. The method includes:

a step of developing a digital model of the applicator 1;
a step of manufacturing the applicator 1 by means of the digital model.

The digital model is a computer file that corresponds to a virtual model of the applicator 1. To produce this model, the applicator 1 is first modelled so as to achieve a CAD model, which is then converted to a suitable format, such as an .STL file. The file is then used by the additive manufacturing machine. During the reading, the digital model is separated into a given number of layers, depending on the required level of accuracy. Preferably, the layers correspond to a transversal cross-section 7 of the applicator 1, i.e. a cross-section of the applicator 1 taken in a plane perpendicular to the direction of longitudinal extension X.

Suitable materials for the manufacturing each of the first and second parts 3, 5 and the protrusions 13 by three-dimensional printing are polyamides, photosensitive resins, polylactic acid (PLA), and acrylonitrile butadiene styrene (ABS).

Figure 1:
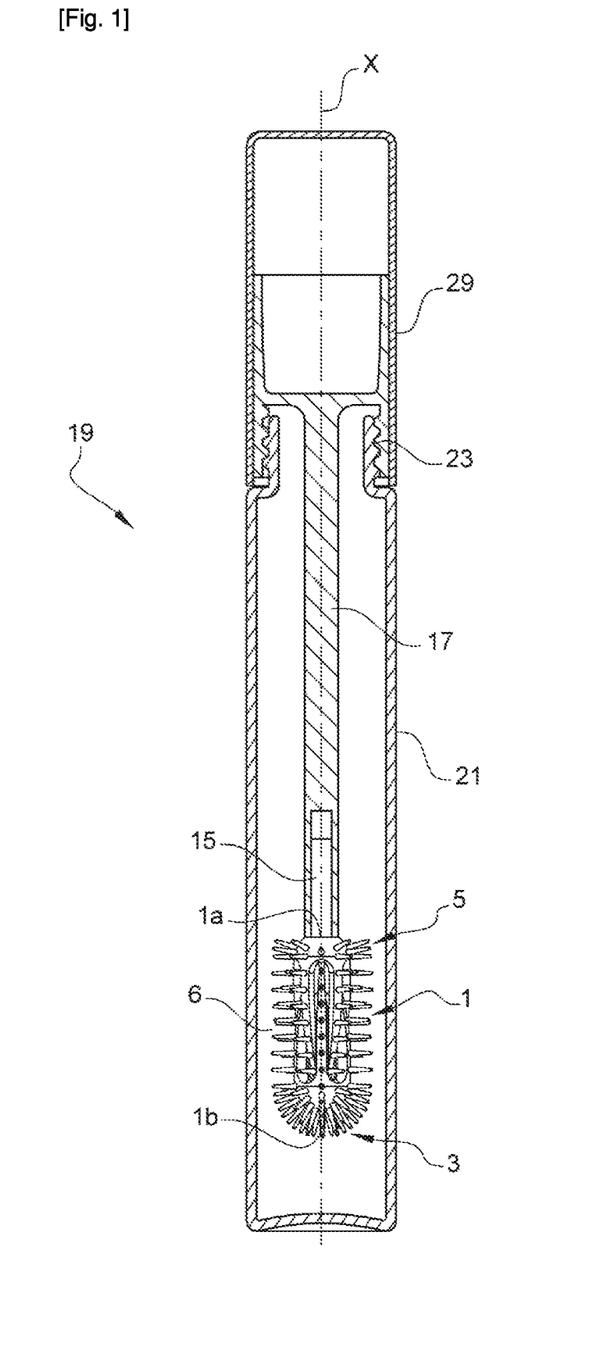
FIG. 1 is a cross-section view of an example of an applicator assembly according to a first embodiment of the invention.

The invention also relates to an applicator assembly 19 for a cosmetic product, including a container 21 including a body forming a reservoir intended to contain the cosmetic product (not shown), and an applicator 1 as described previously, adapted to be fixed on the container 21, so that the applicator 1 is housed inside the reservoir. The applicator 1 is fixed, for example, to a proximal end 3*a* of the rod 17, the rod being fixed to a cover 29 that is advantageously screwed on the container 21. Of note, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", and/or "including," when used in this specification, specify the presence of stated features, integers, steps, operations, elements, and/or components, but do not preclude the presence or addition of one or more other features, integers, steps, operations, elements, components, and/or groups thereof.

As well, the corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

The invention claimed is:

1. An applicator for a cosmetic product, comprising a first part and a second part that extend along a direction of longitudinal extension from a proximal end to a free distal end of the applicator,
    the first part and the second part being configured to form parts for applying the cosmetic,
    one of the parts is mounted mobile in translational with respect to the other of said parts; and while the first part and the second part are engaged such that the first part and the second part are positionable between a retracted position and a deployed position at least during the application of the cosmetic product,
    wherein, in both the retracted position and the deployed position, the first part and the second part together define an interior cavity within the applicator for holding the cosmetic product, wherein the interior cavity has a first volume when the first part and the second part are in the retracted position and a second volume when the first part and the second part are in the deployed position,
    each of the first and second parts comprises at least two longitudinal branches, the at least two longitudinal branches of the first part being circumferentially alternated with the at least two longitudinal branches of the second part, the branches of the first part and the branches of the second part at least partially defining the interior cavity; and,
    each of the first and second parts comprises at least one opening arranged between two consecutive branches, the opening enabling both a passage of a branch of the other part and a distribution of the cosmetic product through the opening from the interior cavity.

2. The applicator according to claim 1, wherein each part is a single monolithic part.

3. The applicator according to claim 1, wherein said applicator is produced without assembly operations.

4. The applicator according to claim 1, wherein the opening has a width greater than the width of the branch passing through the opening so as to enable a rotational range of motion of the part that is mobile with respect to the other part.

5. The applicator according to claim 1, wherein all or at least a part of said branches comprises at least one row of protrusions protruding and extending radially along the longitudinal extension.

6. The applicator according to claim 5, wherein the first part has a free distal end provided with protrusions and a proximal end arranged in the internal volume of the second part and the second part has a free distal end not provided with protrusions and arranged in the internal volume of the first part.

7. The applicator according to claim 5, wherein the applicator is produced by additive manufacturing and said protrusions are integrally formed with said branches.

8. The applicator according to claim 1, wherein the proximal end of the second part is configured to be secured to a rod of the applicator and the proximal end of the first part is free and the first part is mobile in translation with respect to the second part.

9. The applicator according to claim 1, wherein the proximal end of the first part is configured to be secured to a rod of the applicator, the proximal end of the second part is free and comprises an orifice crossed by the proximal end of the first part and the second part is mobile in translation with respect to the first part.

10. An applicator assembly for a cosmetic product, comprising:
    a container comprising a body forming a reservoir intended to contain the cosmetic product, and
    an applicator for a cosmetic product adapted to be secured to the container, so that the applicator is housed inside the reservoir, the applicator, comprising a first part and a second part that extend along a direction of longitudinal extension from a proximal end to a free distal end of the applicator,
    the first part and the second part being configured to form parts for applying the cosmetic,
    one of the first part or the second part is mounted mobile in translational with respect to the other of said first part or the second part, at least during the application of the cosmetic product, from at least a retracted position, to a deployed position,
    wherein, in both the retracted position and the deployed position, the first part and the second part together define an interior cavity within the applicator for holding the cosmetic product,
    each of the first and second parts comprises at least two longitudinal branches, the at least two longitudinal branches of the first part being circumferentially alternated with the at least two longitudinal branches of the second part, the branches of the first part and the branches of the second part at least partially defining the interior cavity; and,
    wherein each of the parts is hollow, so as to define the interior cavity when the first part and the second part are engaged in each other
    each of the first and second parts comprises at least one opening arranged between two consecutive branches, the opening enabling a passage of a branch of the other part and distribution of the cosmetic product.

* * * * *